United States Patent
Scherble et al.

(10) Patent No.: US 8,722,751 B2
(45) Date of Patent: May 13, 2014

(54) THERMOSTABLE MICROPOROUS POLYMETHACRYLIMIDE FOAMS

(75) Inventors: Jonas Scherble, Muehltal (DE); Werner Geyer, Muehltal (DE); Hermann Seibert, Darmstadt (DE); Leonhard Maier, Rodgau (DE); Torsten Jahn, Dieburg (DE); Thomas Barthel, Heppenheim (DE)

(73) Assignee: Evonik Rohm GmbH, Darmstadt (DE)

( * ) Notice: Subject to any disclaimer, the term of this patent is extended or adjusted under 35 U.S.C. 154(b) by 1227 days.

(21) Appl. No.: 10/577,815

(22) PCT Filed: Jul. 23, 2004

(86) PCT No.: PCT/EP2004/008218
§ 371 (c)(1),
(2), (4) Date: Apr. 28, 2006

(87) PCT Pub. No.: WO2005/047377
PCT Pub. Date: May 26, 2005

(65) Prior Publication Data
US 2007/0077442 A1  Apr. 5, 2007

(30) Foreign Application Priority Data
Oct. 30, 2003  (DE) .................. 103 50 971

(51) Int. Cl.
*B32B 27/00*  (2006.01)
*B32B 5/18*  (2006.01)
*C08J 9/00*  (2006.01)

(52) U.S. Cl.
USPC ............................. 521/149; 521/150; 521/183

(58) Field of Classification Search
USPC .......... 521/149, 125, 150, 183, 128, 117, 145
See application file for complete search history.

(56) References Cited

U.S. PATENT DOCUMENTS

| 4,847,908 | A | * | 7/1989 | Nieuwendijk et al. | ......... 381/424 |
| 5,225,449 | A | * | 7/1993 | Tada et al. | ........................ 521/77 |
| 5,698,605 | A | * | 12/1997 | Krieg et al. | ..................... 521/77 |
| 5,928,459 | A | * | 7/1999 | Geyer et al. | ................ 156/331.1 |
| 6,396,451 | B1 | * | 5/2002 | Wu et al. | ........................ 343/756 |
| 6,670,405 | B1 | | 12/2003 | Servaty et al. | |
| 7,169,339 | B2 | | 1/2007 | Stein et al. | |
| 2002/0037955 | A1 | * | 3/2002 | Baumann et al. | ............. 524/495 |
| 2004/0034932 | A1 | * | 2/2004 | Zacharopoulos et al. | ........ 5/601 |
| 2004/0235973 | A1 | * | 11/2004 | Stein et al. | ..................... 521/189 |
| 2005/0090568 | A1 | * | 4/2005 | Stein et al. | ...................... 521/50 |

FOREIGN PATENT DOCUMENTS

| DE | 27 26 260 | 12/1978 |
| DE | 102 12 235 | 10/2003 |
| EP | 0 532 023 | 3/1993 |
| EP | 0 874 019 | 10/1998 |
| JP | 9-235401 | 9/1997 |
| WO | 03/020804 | 3/2003 |
| WO | WO 03072647 A1 * | 9/2003 |

OTHER PUBLICATIONS

U.S. Appl. No. 10/568,971, filed Feb. 22, 2006, Scherble, et al.
U.S. Appl. No. 13/812,980, filed Jan. 29, 2013, Kraatz, et al.
U.S. Appl. No. 13/808,472, filed Jan. 4, 2013, Bernhard, et al.
U.S. Appl. No. 13/640,427, filed Oct. 10, 2012, Geyer, et al.
U.S. Appl. No. 13/996,552, filed Jun. 21, 2013, Bernhard, et al.

* cited by examiner

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

The invention relates to compositions for producing polymethacrylimide foams having reduced pore size. The inventive method allows production of a microporous foam with an especially homogeneous pore size distribution without having to use insoluble nucleation agents.

22 Claims, 2 Drawing Sheets

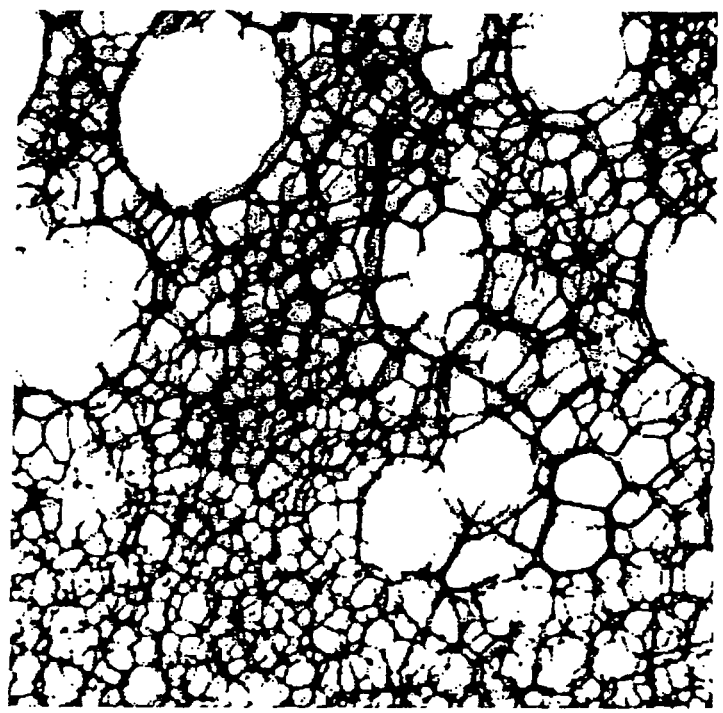
Figure 1: Enlargement of pore structure of Example 1, image dimensions 1 μm*1 μm

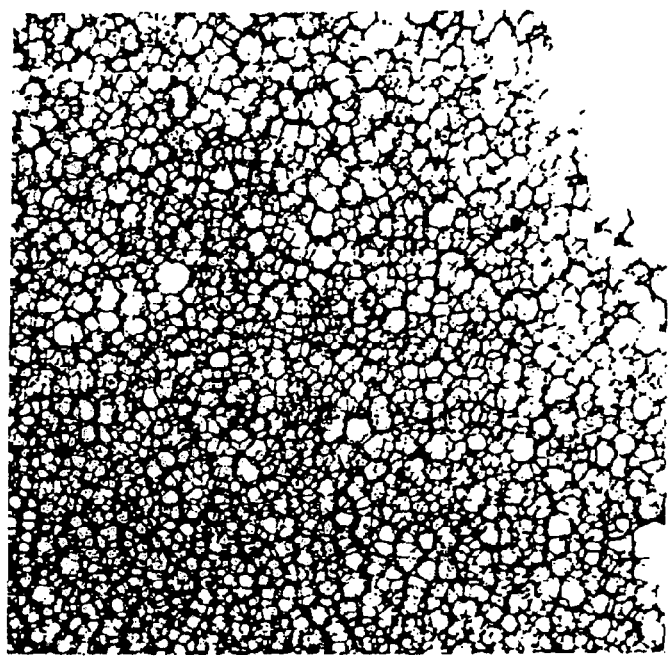
Figure 2: Enlargement of pore structure of Example 3, image dimensions 1 μm*1 μm

THERMOSTABLE MICROPOROUS POLYMETHACRYLIMIDE FOAMS

The invention relates to compositions for producing heat-resistant polymethacrylimide foams with particularly fine pores, and to a process for their production, and to processing and use of these foams.

Polymethacrylimide foams (PMI foams) have now been known for a long time. With the trade name ROHACELL® these foams are in particular widely used in the sector of laminated materials (laminates, composites, foam composites, sandwich structures, sandwich systems). Laminated materials are mouldings composed of an external top layer and of an internal core material. Top layers used comprise materials with uni- or multi-axial capability to withstand extremely high tensile forces. Examples are glass fabrics and carbon fibre fabrics, or else aluminium sheets, which are secured to the core material by adhesive resins. The core materials used preferably comprise materials with low densities, typically in the range of 30 kg/m$^3$ and 200 kg/m$^3$.

A distinction is made between three classes of core materials. A first class which may be mentioned is balsa wood. The fibre structure of balsa wood permits it to withstand high tensile and compressive forces in particular in the direction of the fibres, whereas it has only weak mechanical properties perpendicularly thereto. Balsa wood is therefore a highly anisotropic material. The average density is relatively high at ~150 kg/m$^3$, but is nevertheless still sufficiently low for many applications. Core materials of this type are marketed, by way of example, with the trade mark Baltec® from the producer DIAB.

Another class of core materials is provided by the honeycomb structures, e.g. Nomex® honeycombs or honey-combs composed of aluminium. Honeycomb structures feature particularly low densities together with high load-bearing capability in the longitudinal direction of the honeycombs. In this respect honeycombs are superior to other core materials. However, if during processing or once the component has been finished forces arise perpendicularly to the honeycomb direction honeycombs have less suitability, because their structure makes them mechanically weak perpendicularly to the longitudinal direction. Another disadvantage is that the resin used to produce the sandwich structure can migrate into the honeycomb, thus increasing the total weight of the structure. This severely limits the choice of methods available for producing sandwich structures on the basis of honeycombs. In particular, the use of relatively low-viscosity resin systems such as those used in the resin injection process is not possible with honeycombs. Another problem is the ease of processing of the honeycombs, this being very complicated and therefore expensive in particular in the case of articles whose shape is not entirely simple.

A third class which may be mentioned is that of closed-pore rigid polymer foams. Isotropic foams are capable of withstanding shear forces in any spatial direction. An advantage is ease of processing, which can take place using the tools and machinery usually used for wood. Furthermore, certain rigid foams, e.g. ROHACELL®, can be thermoformed. A considerable advantage of closed-pore rigid foams is that no resin can penetrate and thus increase total weight.

The production of sandwich structures was previously complicated, irrespective of the core materials and top layers used, and this meant that for a long time price-related reasons prevented these structures from gaining full acceptance. Traditional processes for producing sandwich structures are laminating processes with dry application of the top layer to the core material followed by resin saturation. Another method is based on the use of glass mats or carbon fibre mats which have been saturated with a partially polymerized resin ("prepregs"). The viscosity of these resins is generally sufficiently high to prevent any separation of drops.

Relatively recently, new processes known as "resin infusion" have been developed for producing sandwich systems. The sandwich core is covered with dry fibre material and saturated with relatively low-viscosity resin in a closed mould or in an air-tight pouch. The advantage of these methods is firstly a wider resin-system and fibre-material range and secondly easier automation. Sandwich structures can therefore mostly be produced at lower cost with the aid of these processes. Among the resin infusion processes are, by way of example, RTM (resin transfer moulding), RIM (resin infusion moulding), SCRIMP (Seeman's resin infusion moulding Process™) and VARI (vacuum assisted resin infusion). Further details are described in "Resin Transfer Molding, SAMPE® Monograph No. 3" (ISBN 0-938994-83-2). A problem with the infusion processes is that the relatively low-viscosity resins completely fill the open cavities of the core materials, making honeycombs, for example, unsuitable as core materials.

If a closed-pore foam is machined, this inevitably produces open cells at the surface. These represent cavities which are filled by relatively low-viscosity resins and therefore give relatively heavy components. In the case of a completely closed-pore foam, therefore, the resin absorption at the surface of the core material substantially depends on the size of the cells. When large cells are cut open the resultant cavities are deep, and a large amount of resin can penetrate into these.

It is almost impossible to make a direct measurement of resin absorption on the surface of a foam core. The following methods were nevertheless developed in order to compare specimens with one another: first, the density and weight of the test specimen panel are determined with maximum precision. The test specimen is then placed in a known-volume chamber equipped with two access points, and the chamber is sealed so that it can retain a vacuum. Spacers in the chamber ensure that no substantial area of the specimen is in contact with the wall. The total weight is determined. The chamber is evacuated through one access point to 0.2 bar. While maintaining the vacuum, oil is sucked in by way of the second access point and penetrates the surface of the test specimen. The chamber is closed and weighed. The increase in weight gives the weight of oil that has penetrated. Using the density and the weight of the oil, the chamber volume, and also the density and the weight of the test specimen, it is possible to calculate the volume, and therefore the weight, of the oil that has penetrated into the surface of the test specimen. The table below lists the oil absorptions of selected, commercially available foams.

TABLE 1

Oil absorption of some polymer foams with densities in the range 60-80 kg/m$^2$.

| Type/producer | Based on | Density kg/m$^3$ | Oil absorption kg/m$^2$ |
|---|---|---|---|
| R82.60/Airex | PEI | 60 | 0.68 |
| R82.80/Airex | PEI | 80 | 0.30 |
| C70.75/Airex | PVC | 80 | 0.44 |
| ROHACELL ® 71A | PMI | 72 | 0.18 |
| ROHACELL ® 71 RIST | PMI | 72 | 0:23 |
| ROHACELL ® 71 WF | PMI | 72 | 0.48 |

The values in the table show that considerable weight savings are possible by way of a reduction in the resin absorption of the core material. A square sheet composed of ROHACELL® 71 RIST of dimensions 1000×1000×10 mm³ weighs 0.72 kg, but during processing absorbs 0.46 kg of resin. A corresponding sheet composed of ROHACELL® 71 WF absorbs as much as 0.96 kg of resin, i.e. more than its own weight.

To save weight in sandwich structures it is therefore necessary to select foams with particularly low resin absorption. Among the oil absorption values for the foams listed in Table 1, low values have previously been achieved in the case of ROHACELL® 71A with 0.18 kg/m². However, foams with even lower resin absorption would be desirable. Furthermore, ROHACELL® 71A is insufficiently resistant to the pressure and the temperature needed for the curing of some resin systems. Assistance here is provided by ROHACELL® 71 RIST, but this has somewhat higher resin absorption.

DE 2726260 describes the production of polymethacrylimide foams (PMI foams) which have excellent mechanical properties even at high temperatures. The foams are produced by the casting process, i.e. monomers and required additives are mixed and polymerized in a cell. The polymer is foamed by heating in a second step. A disadvantage of the foams described in DE 2726260 is their coarse pore structure. A considerable reduction can be achieved in the pore size simply by varying the blowing agents, but it remains too coarse for the production of core materials for the resin injection processes (Comparative Example 1) and exhibits non-uniform pore size distribution (FIG. 1).

It has been possible to produce PMI foams with even smaller pores via the use of insoluble nucleating agents (DE 10212235.0). However, the use of insoluble nucleating agents in the casting process is associated with considerable additional production cost. The density of the monomer mixture to be polymerized is only about 0.8 g/cm³. Substances which can be used as nucleating agents, e.g. silicon dioxide, zinc sulphide, sodium chloride or potassium chloride, have higher densities than the monomer mixture and therefore sediment immediately. A foam with uniform pore structure can only be obtained if the sedimentation of the nucleating agent is suppressed. For this, anti-settling agents, such as Aerosil and carbon blacks, or thickeners, such as soluble, high-molecular-weight polymers, have to be added to the monomer mixture, and these have to be incorporated into the mixtures with the nucleating agent in a complicated process.

Fine-pore foams based on PMI have moreover been described in EP 532023 (Comparative Example 7). However, the process described in that publication has various serious disadvantages. Relatively high concentrations of initiator are used for the polymerization, and although the resultant polymer is prepared by the casting process its weight-average molecular weight is only in the range of 50-500 kDa. Furthermore, no crosslinking agent was added to the mix. For these reasons, the resultant foams have only low heat resistance and poor creep performance.

Fine-pore foams are known and are marketed with the name ROHACELL® by Röhm GmbH & Co KG. It is possible to achieve a fine-pore structure via variation in blowing agents or via the addition of insoluble nucleating agents. However, it is problematic that the fine-pore structure achieved by way of a variation in the blowing agents is not always sufficient. Although relatively fine-pore materials can be produced via the use of insoluble nucleating agents, the latter require the use of antisettling agents, associated with increased production cost.

It was therefore an object of the invention to discover formulations for producing particularly fine-pore PMI foams, without resorting here to the use of insoluble nucleating agents. The foams are moreover intended to have thermomechanical properties as good as those of the known PMI foams.

The object is achieved by a process for producing foamable crosslinked polymers by a mixture composed of
(A) 30-70 parts by weight of methacrylic acid,
  30-60 parts by weight of methacrylonitrile,
  0-30 parts by weight of other monomers having vinyl unsaturation,
(B) 0.01-15 parts by weight of tert-butyl methacrylate and/or tert-butyl acrylate,
(C) 0.01-10 parts by weight of blowing agent,
(D) 0.01-10 parts by weight of crosslinking agent, i.e.
  (D1) polyunsaturated compounds capable of free-radical polymerization, and/or
  (D2) ionic crosslinking agent in the form of a salt containing an at least divalent metal cation, soluble in the monomer mixture,
(E) 0.01 to 2 parts by weight of polymerization initiators and
(F) 0 to 20 parts by weight of conventional additives, e.g. antistatic agents, antioxidants, mould-release agents, lubricants, dyes, flame retardants, flow improvers, fillers, light stabilizers and organophosphorus compounds, such as phosphites or phosphonates, pigments, release agents, weathering stabilizers and plasticizers being polymerized in bulk to give a sheet which, where appropriate, is heat-conditioned and then is foamed at temperatures of from 150 to 250° C.

The invention also provides a foamable crosslinked polymer composed of
(A) 30-70 parts by weight of methacrylic acid,
  30-60 parts by weight of methacrylonitrile,
  0-30 parts by weight of other monomers having vinyl unsaturation,
(B) 0.01-15 parts by weight of tert-butyl methacrylate and/or tert-butyl acrylate,
(C) 0.01-10 parts by weight of blowing agent,
(D) 0.01-10 parts by weight of crosslinking agent, i.e.
  (D1) polyunsaturated compounds capable of free-radical polymerization, and/or
  (D2) ionic crosslinking agent in the form of a salt containing an at least divalent metal cation, soluble in the monomer mixture,
(E) 0.01 to 2 parts by weight of polymerization initiators and
(F) 0 to 20 parts by weight of conventional additives, e.g. antistatic agents, antioxidants, mould-release agents, lubricants, dyes, flame retardants, flow improvers, fillers, light stabilizers and organophosphorus compounds, such as phosphites or phosphonates, pigments, release agents, weathering stabilizers and plasticizers.

Preference is given to using a foamable crosslinked polymer composed of
(A) 30-70 parts by weight of methacrylic acid,
  30-60 parts by weight of methacrylonitrile,
  0-30 parts by weight of other monomers having vinyl unsaturation,
(B) 0.01-4.99 parts by weight of tert-butyl meth-acrylate and/or tert-butyl acrylate,
(C) 0.01-10 parts by weight of blowing agent,
(D) 0.01-10 parts by weight of crosslinking agent, i.e.
  (D1) polyunsaturated compounds capable of free-radical polymerization, and/or
  (D2) ionic crosslinking agent in the form of a salt containing an at least divalent metal cation, soluble in the monomer mixture,
(E) 0.01 to 2 parts by weight of polymerization initiators and
(F) 0 to 20 parts by weight of conventional additives.

Surprisingly, it was found here that the copoly-merization of small amounts of tert-butyl methacrylate or tert-butyl acrylate gives foams with very good thermo-mechanical properties and extremely fine and uniform pore structure.

It has been found that the inventive process can produce foams with high molar masses and excellent thermo-mechanical properties due to the small proportion of tert-butyl methacrylate or tert-butyl acrylate. Good foams are obtained using 0.01-15 parts by weight of tert-butyl methacrylate and/or tert-butyl acrylate. Greater proportions of tert-butyl methacrylate or tert-butyl acrylate soften the polymer, impairing thermo-mechanical properties (Comparative Example 7a). Foamable polymers with molar masses >600 kDa were obtained and can be further processed to give very fine-pore foams.

It is preferable to use 0.01-4.99 parts by weight of tert-butyl methacrylate and/or tert-butyl acrylate, particularly preferably 1.0-4.99 parts by weight of tert-butyl methacrylate and/or tert-butyl acrylate. For polymers capable of uniform and controlled foaming it is necessary to add 0.01-10 parts by weight, preferably 0.05-3 parts by weight, of crosslinking agent. For good foaming it is also necessary to add 0.01-10 parts by weight, preferably 2-8 parts by weight, of blowing agent.

This gives fine-pore foams whose density is in the desired range from 30 to 300 kg/m$^3$.

When compared with DE 10212235.0, the inventive process provides not only less complicated production but also the advantage, via omission of heterogeneous nucleating agents, that the foams have an even finer pore structure. Resin absorption is therefore also lower (Examples 2 and 8 in Table 2).

Examples of the other monomers having vinyl unsaturation of (A) are: acrylic or methacrylic acid, and also esters of these with lower alcohols having 1-4 carbon atoms, styrene, maleic acid or its anhydride, itaconic acid or its anhydride, vinylpyrrolidone, vinyl chloride and/or vinylidene chloride. The proportion of the comonomers for which cyclization to give an anhydride or imide is impossible or very difficult is to be no more than 30 parts by weight, preferably no more than 20 parts by weight and particularly preferably no more than 10 parts by weight, based on the weight of the monomers.

Use may be made of the following compounds or mixtures thereof as blowing agent (C): formamide, formic acid, urea, itaconic acid, citric acid, dicyandiamide, water, monoalkylureas, dimethylurea, 5,5'-azobis(5-ethyl-1,3-dioxane), 2,2'-azobis(N-butylisobutyramide), 2,2'-azobis(N-diethylisobutyramide), 2,2',4,4,4',4'-hexamethyl-2,2'-azopentane, 2,2'-azobis(2-methyl-propane), dimethyl carbonate, di-tert-butyl carbonate, acetone cyanohydrin carbonate, methyl oxiisobutyrate carbonate, N-methylurethane, N-ethylurethane, N-tert-butylurethane, urethane, oxalic acid, maleic acid, oxiisobutyric acid, malonic acid, cyanoformamide, dimethylmaleic acid, tetraethyl methanetetra-carboxylate, N-butyl oxamate, trimethyl methanetri-carboxylate, triethyl methanetricarboxylate, and also monohydric alcohols composed of 3-8 carbon atoms, e.g. 1-propanol, 2-propanol, 1-butanol, 2-butanol, tert-butanol and isobutanol.

Small amounts of crosslinking agent (D) have to be added to the mixes. Slight crosslinking stabilizes the foam during the foaming procedure and thus permits the production of homogeneous foams. At the same time, crosslinking agent improves the heat resistance and the creep performance of the foam. Possible crosslinking agents may be divided into two groups: covalent crosslinking agents (D1), i.e. copolymerizable polyunsaturated compounds. Examples which may be mentioned of these monomers are allyl acrylate, allyl methacrylate, allylacrylamide, allylmethacrylamide, methylenebis(acrylamide) or -(methacrylamide), diethylenebis(allyl carbonate), ethylene glycol diacrylate or ethylene glycol dimethacrylate, diethylene glycol diacrylate or diethylene glycol dimethacrylate, triethylene glycol diacrylate or dimethacrylate, tetraethylene glycol diacrylate or tetraethylene glycol dimethacrylate, tripropylene glycol diacrylate or tripropylene glycol dimethacrylate, 1,3-butanediol diacrylate or 1,3-butanediol dimethacrylate, 1,4-butanediol diacrylate or 1,4-butanediol dimethacrylate, neopentyl diol diacrylate or neopentyl diol dimethacrylate, 1,6-hexanediol diacrylate or 1,6-hexanediol dimethacrylate, trimethylolpropane diacrylate or trimethylolpropane dimethacrylate, trimethylolpropane triacrylate or trimethylolpropane trimethacrylate, pentaerythritol triacrylate or pentaerythritol trimethacrylate, pentaerythritol tetraacrylate or pentaerythritol tetramethacrylate, each of the pentaerythritol derivatives where appropriate also being used in the form of an industrial mixture composed of tri- and tetrafunctional compounds, and also triallyl cyanurate or triallyl isocyanurate. Another group which may be used is that of ionic crosslinking agents (D2). These are polyvalent metal cations which form ionic bridges between the acid groups of the copolymers. Among other examples are the acrylates or methacrylates of the alkaline earth metals or of zinc. Zn (meth)acrylate and Mg (meth)acrylate are preferred. The (meth)acrylate salts may also be prepared via dissolution, by way of example, of ZnO or MgO in the monomer mixture.

Initiators (E) used comprise compounds and initiator systems which can initiate free-radical polymerization reactions. Known classes of compounds are peroxides, hydroperoxides, peroxodisulphates, percarbonates, per-ketals, peroxyesters, hydrogen peroxide and azo compounds. Examples of initiators are hydrogen peroxide, dibenzoyl peroxide, dicyclohexyl peroxo-dicarbonate, dilauryl peroxide, methyl ethyl ketone peroxide, acetylacetone peroxide, di-tert-butyl peroxide, tert-butyl hydroperoxide, cumene hydro-peroxide, tert-butyl peroctanoate, tert-butyl 2-ethyl-perhexanoate, tert-butyl perneodecanoate, tert-amyl perpivalate, tert-butyl perpivalate, tert-butyl perbenzoate, lithium peroxodisulphate, sodium peroxodisulphate, potassium peroxodisulphate and ammonium peroxodisulphate, azoisobutyronitrile, 2,2-azobis-(2,4-dimethylisovaleronitrile), 2,2-azobis-(isobutyronitrile), 2,2'-azobis(2-amidinopropane)dihydrochloride, 2-(carbamoylazo) isobutyronitrile and 4,4'-azobis(cyanovaleric acid). Redox initiators are likewise suitable (H. Rauch-Puntigam, Th. Völker, Acryl-und Methacrylverbindungen [Acrylic and meth-acrylic compounds], Springer, Heidelberg, 1967 or Kirk-Othmer, Encyclopedia of Chemical Technology, Vol. 1, pages 286 et seq., John Wiley & Sons, New York, 1978). It can be advantageous to combine initiators and initiator systems with different decomposition properties in relation to time and temperature. The amounts preferably used of the initiators (E) are from 0.01 to 2 parts by weight, particularly preferably from 0.15 to 1.5 parts by weight, based on the total weight of the monomers.

Conventional additives (F) may also be added to the mixtures. Among these are, inter alia, antistatic agents, antioxidants, mould-release agents, lubricants, dyes, flow improvers, fillers, light stabilizers and organophosphorus compounds, such as phosphites or phosphonates, pigments, release agents, weathering stabilizers and plasticizers. Other possible additives are flame retardants. Besides halogen-containing flame retardants, some of which comprise antimony oxides, it is also possible to use phosphorus-containing compounds. Phosphorus-containing compounds are preferred because smoke toxicity is lower in the event of a fire. Among the phosphorus compounds are, inter alia, phosphanes, phosphane oxides, phosphonium compounds, phosphonates, phosphites and/or phosphates. These compounds may be of organic and/or inorganic character, examples being phosphoric monoesters, phosphonic monoesters, phosphoric diesters, phosphonic diesters and phosphoric triesters, and also polyphosphates.

The poly(meth)acrylimide foams produced according to the invention may be used to produce laminated materials. The inventive poly(meth)acrylimide foams have a wide field of application. They may be used in motor vehicles, in rail vehicles, in aircraft, in watercraft, in spacecraft, in machinery components, in antennas, in X-ray tables, in loudspeakers and in pipes.

The inventive process has the following advantages over the processes of the prior art:
  The polymerization process uses homogeneous, low-viscosity mixtures which can be prepared and further processed in a technically simple manner.
  The foams have an extremely fine pore structure and therefore extremely low resin absorption (Table 3)
  Mechanical properties, heat resistance, and creep performance are markedly better than those of the comparative specimens (Table 4)
  The foams have a particularly homogeneous pore structure (FIG. 2).

The examples given below are given to provide better illustration of the present invention, but are not to be interpreted as restricting the invention to the features disclosed herein.

EXAMPLES

Inventive Examples 1-7

The amounts given in the table of methacrylic acid (MAA), methacrylonitrile (MAN), tert-butanol (tert-BuOH) and tert-butyl methacrylate (tBMA), and also in each case 0.17 part by weight of allyl methacrylate, 0.1 part by weight of MgO, 0.40 part by weight of tert-butyl perpivalate, 0.036 part by weight of tert-butyl 2-ethylperhexanoate, 0.10 part by weight of tert-butyl perbenzoate, 0.103 part by weight of cumyl perneodecanoate, 0.005 part by weight of benzoquinone and 0.16 part by weight of PAT 1037 (supplied by: E. und P. Würtz GmbH & Co. KG, Industriegebiet, In der Weide 13+18, 55411 Bingen, Sponsheim) as release agent were carefully mixed. The mixture was polymerized for 48 hours in a cell of thickness 23 mm and then subjected to 3 hours of a temperature programme extending from 40° C. to 115° C. The polymers were foamed in a convection oven under the conditions given in the table. The pore sizes were determined with the aid of a macroscope.

TABLE 2

Composition, foaming conditions, density and pore size of foam specimens 1-7.

| Example | MAA pbw | MAN pbw | tBMA pbw | tert-BuOH pbw | Foaming °C./h | Density kg/m³ | Pore size μm |
|---|---|---|---|---|---|---|---|
| 1 | 50.0 | 50.0 | 0.0 | 8.0 | 220/2 | 61 | 50-200 |
| 2 | 50.0 | 50.0 | 1.0 | 7.5 | 220/2 | 69 | 35 |
| 3 | 49.0 | 50.0 | 2.0 | 7.0 | 200/2 | 75 | 20 |
| 4 | 47.0 | 50.0 | 4.0 | 6.0 | 200/2 | 77 | 10 |
| 5 | 46.0 | 50.0 | 6.0 | 1.5 | 230/2 | 81 | 7 |
| 6 | 44.0 | 50.0 | 10.0 | 2.0 | 230/2 | 57 | 7 |
| 7 a) | 39.7 | 40.3 | 20.0 | 0 | 200/2 | 75 | 5 | a) Very brittle foam, difficult to machine

The pore sizes in Table 2 clearly show that substitution of tert-BuOH by tBMA can make the pore structure considerably finer. It appears that tBMA operates simultaneously as blowing agent and nucleating agent.

Comparative Example 8

Insoluble Nucleating Agents 290 g (2.9 parts by weight) of formamide and 290 g (2.9 parts by weight) of isopropanol as blowing agent were added to a mixture composed of 5000 g of methacrylic acid (50.0 parts by weight), 5000 g of methacrylo-nitrile (50.0 parts by weight) and 17 g (0.17 part by weight) of allyl methacrylate. 40 g (0.40 part by weight) of tert-butyl perpivalate, 3.6 g (0.036 part by weight.) of tert-butyl 2-ethylperhexanoate, 10 g (0.10 part by weight) of tert-butyl perbenzoate, 10.3 g (0.103 part by weight) of cumyl perneodecanoate, 400 g (4.0 parts by weight) of Degalan BM 310 (high-molecular-weight polymethyl methacrylate), 0.5 g (0.005 part by weight) of benzoquinone and 16.0 g (0.32 part by weight) of PAT 1037 as release agent were also added to the mixture.

As nucleating agent, 25 g of $SiO_2$ particles with grain size <5 μm (powdered quartz with the trade mark Mikrosil® LM500, supplied by Euroquarz GmbH, Kirchhellener Allee 53, 46282 Dorsten) were added to the mixture.

The mixture was stirred until it was homogeneous, and then polymerized for 18.5 h at 39° C. in a cell formed from two glass plates of dimensions 50×50 cm and an edge seal of thickness 2.3 cm. The polymer was then subjected for 17.25 h to a temperature programme extending from 40° C. to 115° C., to complete the polymerization. The mixture was then foamed for 2 h at 205° C. The resultant foam had an envelope density of 77 kg/m³.

Comparative Example 9

No Nucleating Agent

The procedure was as described in Comparative Example 8 except that no nucleating agent was used. The resultant foam had an envelope density of 77 kg/m³.

TABLE 3

Pore size and resin absorption of selected specimens compared

| Example | Foam density kg/m³ | Pore size μm | Resin absorption kg/m² |
|---|---|---|---|
| 2 | 69 | 35 | <0.040 a) |
| 8 | 77 | 100-200 | 0.061 |
| 9 | 77 | Not determined | 0.287 | a) not measurable

TABLE 4

| | | Mechanical data | | |
|---|---|---|---|---|
| Example | Density kg/m³ | Compressive strength a) MPa | Heat resistance b) ° C. | Creep c) % |
| 2 | 69 | 2.1 | 224 | −0.15 |
| 6 | 68 | 1.8 | 215 | 0.05 |
| 7 | 66 | 1.8 | 210 | 0.57 |
| 8 | 67 | 1.5 | Not determined | 0.3 | a) DIN 53452
b) DIN 53424
c) DIN 53425, ASTM D621 and D2990: 180° C., 2 h, 0.35 MPa

The invention claimed is:

1. A process for producing a foamable crosslinked polymer, comprising:
  polymerizing a mixture comprising
  (A) 30-70 parts by weight of methacrylic acid,
    30-60 parts by weight of methacrylonitrile,
    0-30 parts by weight of other monomers having vinyl unsaturation,
  (B) 0.01-4.99 parts by weight of tert-butyl methacrylate,
  (C) 0.01-10 parts by weight of a blowing agent,
  (D) 0.01-10 parts by weight of a crosslinking agent,
  (E) 0.01 to 2 parts by weight of a polymerization initiator, and
  (F) 0 to 20 parts by weight of a conventional additive, in bulk to give a polymer in the form of a sheet;
  wherein said sheet is optionally subjected to the following treatment:
    heat-conditioning and then foaming at temperatures of from 150 to 250° C.;
  foaming to obtain a foam having extremely fine and uniform pore structure having a pore size of 10-35 μm.

2. A poly(meth)acrylimide foam which is obtained via foaming of a foamable polymer obtained according to the process of claim 1.

3. A laminated material comprising a layer of a poly(meth)acrylimide foam according to claim 2.

4. A vehicle, comprising:
  the poly(meth)acrylimide foam according to claim 2;
  wherein said vehicle is selected from the group consisting of a motor vehicle, a rail vehicle, a watercraft, an aircraft or a spacecraft.

5. A machine component comprising the poly(meth)acrylimide foam according to claim 2.

6. An antenna comprising the poly(meth)acrylimide foam according to claim 2.

7. An X-ray table comprising the poly(meth)acrylimide foam according to claim 2.

8. A loudspeaker comprising the poly(meth)acrylimide foam according to claim 2.

9. A pipe comprising the poly(meth)acrylimide foam according to claim 2.

10. The poly(meth)acrylimide foam according to claim 2, wherein said foamable polymer has a molar mass of >600 kDa.

11. The poly(meth)acrylimide foam according to claim 2, wherein said foam is a fine-pore foam having a density in the range from 30 to 300 kg/m³.

12. The process for producing the foamable crosslinked polymer according to claim 1, wherein said sheet is heat-conditioned and foamed.

13. The process for producing the foamable crosslinked polymer according to claim 1, wherein said foamable polymer has a molar mass of >600 kDa.

14. The process for producing the foamable crosslinked polymer according to claim 1, wherein said foam is a fine-pore foam having a density in the range from 30 to 300 kg/m³.

15. The process for producing the foamable crosslinked polymer according to claim 1, wherein said mixture comprises (B) 1 to 2 parts by weight of tert-butyl methacrylate.

16. A foamable crosslinked polymer, comprising in polymerized form:
  (A) 30-70 parts by weight of methacrylic acid,
    30-60 parts by weight of methacrylonitrile,
    0-30 parts by weight of other monomers having vinyl unsaturation,
  (B) 0.01-4.99 parts by weight of tert-butyl methacrylate,
  (C) 0.01-10 parts by weight of a blowing agent,
  (D) 0.01-10 parts by weight of a crosslinking agent,
  (E) 0.01 to 2 parts by weight of a polymerization initiator, and
  (F) 0 to 20 parts by weight of a conventional additive; and
  wherein said foamable crosslinked polymer is capable of being foaming to obtain a foam having extremely fine and uniform pore structure having a pore size of 10-35 μm.

17. The foamable crosslinked polymer according to claim 16, having a molar mass of >600 kDa.

18. The foamable crosslinked polymer according to claim 16, comprising (B) 1 to 2 parts by weight of tert-butyl methacrylate.

19. A process for producing a foamable crosslinked polymer, comprising:
  polymerizing a mixture comprising
  (A) 30-70 parts by weight of methacrylic acid,
    30-60 parts by weight of methacrylonitrile,
    0-30 parts by weight of other monomers having vinyl unsaturation,
  (B) 0.01-4.99 parts by weight of tert-butyl methacrylate,
  (C) 0.01-10 parts by weight of a blowing agent,
  (D) 0.01-10 parts by weight of a crosslinking agent,
  (E) 0.01 to 2 parts by weight of a polymerization initiator, and
  (F) 0 to 20 parts by weight of a conventional additive, in bulk to give a polymer in the form of a sheet;
  wherein said sheet is subjected to the following treatment:
    heat-conditioning and then foaming at temperatures of from 150 to 250° C. to obtain a foam having extremely fine and uniform pore structure having a pore size of 10-35 μm.

20. The process for producing the foamable crosslinked polymer according to claim 19, wherein said mixture comprises (B) 1 to 2 parts by weight of tert-butyl methacrylate.

21. A foamable crosslinked polymer, comprising in polymerized form:
  (A) 30-70 parts by weight of methacrylic acid,
    30-60 parts by weight of methacrylonitrile,
    0-30 parts by weight of other monomers having vinyl unsaturation,
  (B) 0.01-4.99 parts by weight of tert-butyl methacrylate,
  (C) 0.01-10 parts by weight of a blowing agent,
  (D) 0.01-10 parts by weight of a crosslinking agent,
  (E) 0.01 to 2 parts by weight of a polymerization initiator, and
  (F) 0 to 20 parts by weight of a conventional additive;
  wherein when said polymer is subjected to heat-conditioning and then foaming at temperatures of from 150 to 250° C., a foam having extremely fine and uniform pore structure having a pore size of 10-35 μm is obtained.

22. The foamable crosslinked polymer according to claim 21, comprising (B) 1 to 2 parts by weight of tert-butyl methacrylate.

* * * * *